June 23, 1953  S. DIAMOND  2,642,926
ARMREST FOR AUTOMOBILES
Filed March 18, 1950

INVENTOR
Sylvan Diamond.
BY
ATTORNEYS.

Patented June 23, 1953

2,642,926

UNITED STATES PATENT OFFICE 2,642,926

ARMREST FOR AUTOMOBILES

Sylvan Diamond, Detroit, Mich.

Application March 18, 1950, Serial No. 150,517

2 Claims. (Cl. 155—112)

The present invention relates to arm rests for use in automobiles and trucks and especially intended to add to the comfort of the driver, or of a passenger on the front seat or of both.

A purpose of the invention is to provide a comparatively simple, strong, and rigid support for the right arm of the driver.

A further purpose is to employ a single unitary strip of material for an arm rest, desirably making the same from sheet metal or from plastic.

A further purpose is to interconnect the arm rest portion to the hook portion of the arm rest by a bend stiffened by ribs extending on either side of the bend and across the bend.

A further purpose is to provide a lip at the front end of the arm rest portion to improve the appearance and to provide a gradual deflecting surface beneath the arm of the user at the forward end.

Further purposes appear in the specification and in the claims.

In the drawings I have chosen to illustrate one only of the numerous embodiments in which my invention may appear, selecting the form shown from the standpoints of convenience in illustration, satisfactory operation and clear demonstration of the principles involved.

Figure 1:
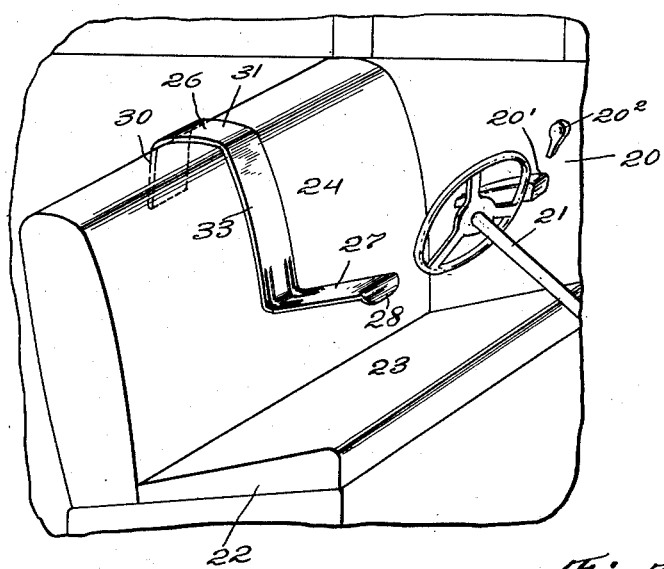
Figure 1 is a fragmentary perspective of the interior of an automobile showing the arm rest of the invention mounted on the back of the front seat.
Figure 2:
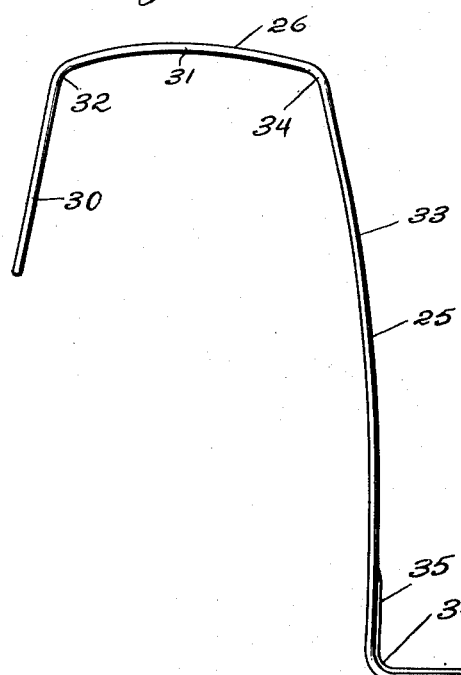
Figure 2 is a side elevation of the arm rest of the invention.
Figure 3:
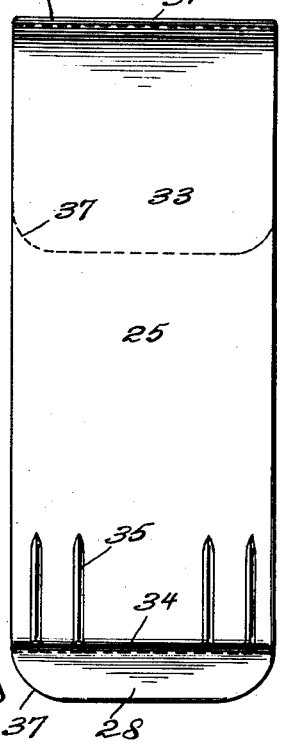
Figure 3 is a front view of Figure 2.

Describing in illustration but not in limitation and referring to the drawings:

Efforts have been made in the prior art to provide support for the right arm of the driver or for the left arm of the passenger on the front seat of an automobile. The devices employed, however, have been complicated, expensive and lacking in rigidity.

In accordance with the present invention, a single unitary strip of material desirably of uniform width and thickness is employed for making the arm rest. The material may for example to advantage be aluminum alloy sheet, steel sheet or a plastic for example methyl methacrylate. Other suitable materials may be used.

In accordance with the invention the strip is deformed to produce a supporting hook having a downwardly curved depending portion which rests on the cushion of the back of the front seat, a forwardly projecting rest and a downwardly depending forward lip.

In Figure 1 I illustrate the interior of an automobile 20 showing a steering column 21, a driver's left arm rest 20', a door handle 20², and a front seat 22 having a bottom cushion 23 and a back 24.

The arm rest of the invention is made from a desirably uniformly wide strip 25 of suitable material as shown which is deformed to produce a hook 26, an arm rest portion 27 and a forward lip 28. It is important that the strip be at least as wide as the arm (4 inches) and preferably about 6 inches wide, to provide proper support.

The hook 26 comprises a generally straight rear portion 30, which as shown in Figure 1 rests behind the back of the front seat, a slightly convexly upwardly curved bridge portion 31 extending over the top of the back of the front seat and making a substantial right angle connection at 32 with the rear portion 30, and a reverse bent portion 33 desirably slightly convex on the forward side as shown, extending in a general transverse direction to the bridge 31 and making a substantial right angle 34 with the bridge.

The depending portion 33 is generally extending in the same direction as the straight portion 30 at the back of the hook. The length of the depending portion will depend upon the height of the back of the seat, but it has been found that a length of about 13 inches is generally suitable.

At the bottom the depending portion makes a substantial right angle at 34 with the arm rest portion 27.

On either side of the angle 34 the material is ribbed at 35 extending across the bend of the angle producing fillets as shown, and increasing the depth of section greatly stiffening the structure.

The ribs are desirably deformed from the sheet in stamping or molding.

The length of the arm rest portion can to advantage be at least 8 inches exclusive of the lip.

The lip 28 is suitably downwardly extending, making an angle at 36 with the arm rest portion which approximates a right angle, or as shown is between 45° and a right angle.

The corners of the strip are conveniently cut on curves 37 to prevent injury to personnel and improve the appearance.

In operation the device can conveniently be left in place when not in use or can be stored as in the trunk of the car. When it is to be used, the hook 26 is anchored over the top of the back of the front seat, allowing the arm rest portion 27 to extend forwardly and support the forearm of the driver or the driver's elbow, and/or the forearm or elbow of the adjoining passenger.

It will be evident that a very simple construction is provided which can be manufactured at moderate cost and which is sturdy and reliable in use.

Any suitable decorative or corrosion protecting finish may be applied on my arm rest.

In view of my invention and disclosure variations and modifications to meet individual whim or particular need will doubtless become evident to others skilled in the art, to obtain all or part of the benefits of my invention without copying the structure shown and I, therefore, claim all such insofar as they fall within the reasonable spirit and scope of my claims.

Having thus described my invention what I claim as new and desire to secure by Letters Patent is:

1. In an arm rest for automobiles, a single unitary strip of material having a straight portion at one end, a slightly convexly curved portion extending generally transversely from the straight portion, a reverse bent slightly convexly curved portion extending generally transversely to the slightly curved portion first mentioned and generally in the same direction as the straight portion first mentioned, and a rest portion extending generally transversely to the reverse bent portion and having a length of at least 8", there being ribs extending across the junction between the rest portion and the reverse bent portion.

2. In an arm rest for automobiles, a single unitary strip of material having a straight portion at one end, a slightly convexly curved portion extending generally transversely from the straight portion, a reverse bent slightly convexly curved portion extending generally transversely to the slightly curved portion first mentioned and generally in the same direction as the straight portion first mentioned, a rest portion extending generally transversely to the reverse bent portion and having a length of at least 8", there being ribs extending across the junction between the rest portion and the reverse bent portion and a lip at the end of the rest portion deflected at a sharp angle from the rest portion generally in the direction of the reversely bent portion.

SYLVAN DIAMOND.

References Cited in the file of this patent

UNITED STATES PATENTS

| Number | Name | Date |
|---|---|---|
| D. 87,702 | Aufiero | Sept. 6, 1932 |
| 1,695,549 | Hausler | Dec. 18, 1928 |
| 1,790,803 | Francis | Feb. 3, 1931 |
| 2,584,732 | Okun | Feb. 5, 1952 |

FOREIGN PATENTS

| Number | Country | Date |
|---|---|---|
| 21,215 | Australia | Feb. 6, 1935 |